March 28, 1939. F. FRIEDHEIM 2,152,377
DEPTH GAUGE FOR RAKES
Filed May 3, 1937
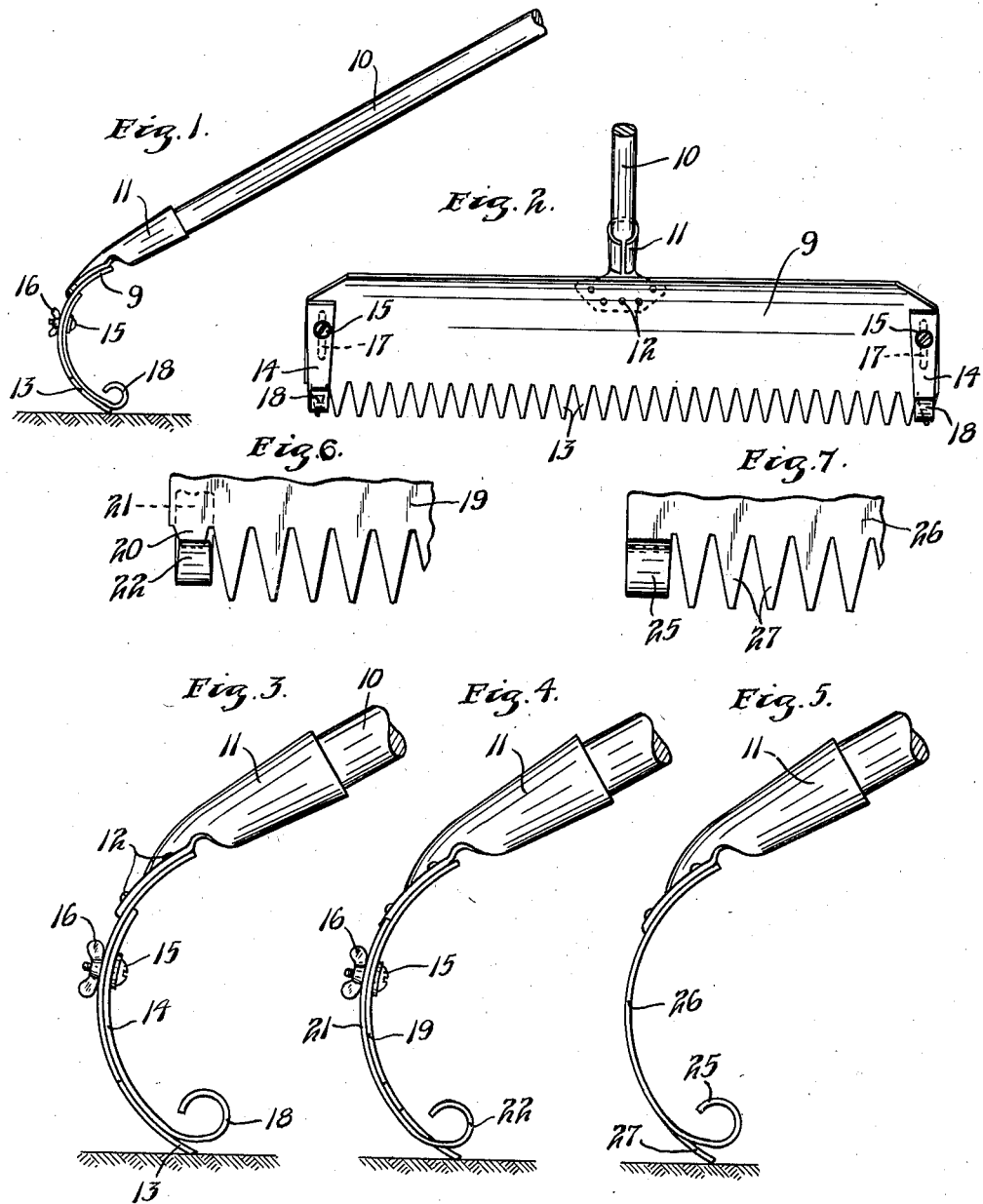
INVENTOR.
FRANK FRIEDHEIM
BY HIS ATTORNEYS.
Williamson & Williamson Patented Mar. 28, 1939

2,152,377

UNITED STATES PATENT OFFICE 2,152,377

DEPTH GAUGE FOR RAKES

Frank Friedheim, Minneapolis, Minn.

Application May 3, 1937, Serial No. 140,303

2 Claims. (Cl. 55—10)

This invention relates to rakes and more particularly to rakes used as small hand garden tools for raking lawns and for similar purposes.

It is a general object of my invention to provide a rake with means for preventing the teeth from penetrating too deeply into the ground over which the rake is drawn to keep from destroying grass roots and the like.

Another object is to provide a depth gauge for rakes which is of extremely simple construction and which can be incorporated in well known rake structures with little difficulty.

A still further object is to provide a depth gauge which closely follows the shape of the rake itself and is not cumbersome either in appearance or operation.

These and other objects and advantages of the invention will more fully appear from the following description made in connection with the accompanying drawing, wherein like reference characters refer to the same or similar parts throughout the various views, and in which:

Fig. 1 is a side elevation showing the general structure of my improved rake;

Fig. 2 is a front elevation with part of the handle broken away;

Fig. 3 is an enlarged side elevation of one embodiment;

Figs. 4 and 5 are side elevations of different embodiments of the invention;

Fig. 6 is an enlarged fragmentary detail showing the lower corner structure of the embodiment of the rake illustrated in Fig. 4; and Fig. 7 is an enlarged fragmentary detail of a lower corner structure of the embodiment of the rake illustrated in Fig. 5.

In the embodiment shown in Figs. 1, 2 and 3, I have provided a rake which comprises a sheet of metal 9 which is of curved shape as shown in the drawing, and which has suitably secured thereto a handle 10. I have illustrated a socket member 11 which is adapted to receive the handle and which is secured to the sheet forming the head of the rake by rivets 12. The lower edge of the sheet of curved metal 9 is provided with a plurality of teeth 13 whose depths are substantially less than the height of the sheet of metal in which they are formed. These teeth are of triangular shape and consequently the spaces between them are also triangular. A rake of this particular type is of particular advantage for raking lawns upon which dandelions are growing. When the rake is drawn across the surface of the lawn, the triangular teeth will catch and break off the dandelions and other weeds having enlarged heads and the unbroken curved surface of the sheet 9 will collect the heads of the weeds and draw them along in the raking operation. Rakes which have relatively long spaced tines permit weeds, leaves and other waste material to slip between the tines and do not effectively remove such material from the lawn.

The depth gauge shown in Figs. 1-3, inclusive, includes a pair of metal strips 14 which are preferably flat transversely of themselves. The strips of metal 14 are of a substantial height and curve to fit flush with the concave inner surface of the plate 9 which makes up the body of the rake. The gauge elements 14 are secured to the sheet 9 by bolts 15 provided preferably with wing nuts 16, the bolts passing through holes in the gauge elements and also through slots 17 which are vertically disposed at opposite sides of the rake body or sheet 9. This type of connection permits adjustment of the gauge elements vertically relative to the body of the rake. The lower ends of the gauge elements are curved downwardly and outwardly from the line of curvature of the rake body, as shown at 18, and this curvature is continued preferably to form a nearly complete relatively circular bend. It will be noted that the curled or bent-over lower ends of the gauge elements are adjacent the ends of the line of teeth 13 and since these gauge elements have a relatively broad rounded surface they will slide along the ground and permit the sharp teeth of the rake to penetrate the ground to a degree limited by the adjustment of the gauge elements. With the elements 14 positioned on the concave side of the sheet or body 9 they are re-enforced by the body since the operative movement of the rake is in the direction faced by the concave side of the rake body. Consequently, practically the entire lengths of the gauge elements are rigidly supported against bending strain by the body of the rake.

In Fig. 4 there is shown a sheet or body 19 which corresponds to the body 9 described in the first embodiment. It differs, however, in one respect. As better shown in the detail view in Fig. 6 at least a part of the end tooth 20 is cut away at each end of the rake body to permit the curved lower portions of the gauge elements 21 to extend from their position on the rear or convex side of the sheet forming the rake body to a point alongside the row of teeth, and if preferred, to a point a little in front of the teeth of the rake. In this embodiment it can readily be seen that the curved ground engaging portions 22 of the gauge elements will contact the ground at a point in alignment with the teeth of the rake. Adjustment of the gauge elements 21 is similar to that shown in the first embodiment and includes an elongated slot in the body 19 with a bolt and wing nut.

In Figs. 5 and 7 there is shown a gauge element 25 which is integral with the metal of the rake body 26. This is a much simpler form of construction, but of course it does not permit adjustment of the gauge elements relative to the teeth 27. In this embodiment as in the others, the curved gauge elements 25 can be bent either forwardly or backwardly.

From the foregoing it will be seen that I have provided an extremely inexpensive and simply constructed depth gauge for rakes which will permit the use of the rake even over the tender shoots of newly grown grass without disturbing the roots of the grass. However, if it is desired to merely scratch the surface of the ground to loosen it, the gauge can be set in such a manner that the teeth will penetrate the ground to any extent desired. While the gauge elements are adjustable in all but one embodiment of the invention, the adjusting means is so simple that there is nothing which can get out of order or require any special attention.

In view of the fact that the gauge elements are flat in cross section and are longitudinally curved to fit flush against the curved face of the body of the rake, it will be noted that there will be little or no tendency for the gauge elements to twist with respect to the rake body even though there is a single bolt securing each of the elements. It is, therefore, unnecessary to tighten the wing nuts securing the gauge elements to an extent which would prevent their loosening for adjustment without difficulty. This adjustment can be quickly made by loosening the wing nuts with the fingers and re-setting the gauge elements to any desired position.

It will, of course, be understood that various changes may be made in the form, details, arrangement and proportions of the various parts without departing from the scope of my invention.

What is claimed is:

1. A rake comprising an elongated, concavely curved sheet metal rake head having at its lower edge a multiplicity of longitudinally contiguous, triangular-shaped, sheet metal teeth forming triangular-shaped notches between them, a handle secured to said rake head and a pair of sheet metal depth gauge plates one mounted at each end of said head, said depth gauge plates fitting downwardly from above said teeth flush against the convex side of said head for some little distance and having lower partially rolled cylinder-like portions underlying and projecting in advance of said teeth relative to the direction of raking movement of the rake over the ground to form smooth, rounded ground engaging runners adjacent the end teeth.

2. A rake comprising an elongated, concavely curved sheet metal rake head having at its lower edge a multiplicity of longitudinally contiguous triangular-shaped sheet metal teeth forming triangular-shaped notches between them, a handle secured to said rake head and a pair of depth gauge members one mounted at each end of said head, said depth gauge members extending downwardly from above said teeth adjacent said head for some little distance and having lower runner portions projecting in advance of the teeth relative to the direction of raking movement of the rake over the ground.

FRANK FRIEDHEIM.